United States Patent
Jeong et al.

(10) Patent No.: US 12,455,666 B2
(45) Date of Patent: Oct. 28, 2025

(54) TWO-TERMINAL STRETCHABLE TOUCH ARRAY SENSOR AND METHOD OF PREPARING THE SAME

(71) Applicant: POSTECH RESEARCH AND BUSINESS DEVELOPMENT FOUNDATION, Pohang-si (KR)

(72) Inventors: Unyong Jeong, Pohang-si (KR); Junchen Luo, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/747,418

(22) Filed: Jun. 18, 2024

(65) Prior Publication Data

US 2025/0103174 A1    Mar. 27, 2025

(30) Foreign Application Priority Data

Sep. 26, 2023    (KR) .......................... 10-2023-0129015

(51) Int. Cl.
    *G06F 3/044*    (2006.01)
(52) U.S. Cl.
    CPC .. *G06F 3/0448* (2019.05); *G06F 2203/04102* (2013.01); *G06F 2203/04103* (2013.01)
(58) Field of Classification Search
    CPC ......... G06F 3/0448; G06F 2203/04102; G06F 2203/04103
    USPC ........................................................ 345/173
    See application file for complete search history.

(56) References Cited

U.S. PATENT DOCUMENTS

| 2012/0105359 A1* | 5/2012 | Kim ...................... G06F 3/0412 |
| | | 345/174 |
| 2013/0285970 A1* | 10/2013 | Ahn ........................ G06F 3/045 |
| | | 324/705 |
| 2021/0349546 A1* | 11/2021 | Morrison .............. G06F 3/0202 |

(Continued)

FOREIGN PATENT DOCUMENTS

| CN | 112834086 A | * | 5/2021 | ............. G01L 1/142 |
| CN | 115020005 A | * | 9/2022 | |
| KR | 20090015414 A | | 2/2009 | |

(Continued)

OTHER PUBLICATIONS

Li (Li, Yanyan et al, "Printable Liquid Metal Microparticle Ink for Ultrastretchable Electronics", ACS Appl. Mater. Interfaces, 12, 45, 50852-50859, published Oct. 27, 2020, https://doi.org/10.1021/acsami.0c15084) (Year: 2020).*

(Continued)

*Primary Examiner* — Mark Edwards
(74) *Attorney, Agent, or Firm* — Morgan, Lewis & Bockius LLP

(57) ABSTRACT

Provided are a two-terminal stretchable touch array sensor and a method of preparing the two-terminal stretchable touch array sensor, and the two-terminal stretchable touch array sensor includes an upper electrode including an upper electrode pattern embedded in a first elastic substrate, a lower electrode including a lower electrode pattern embedded in a second elastic substrate, a spacer interposed between the upper electrode and the lower electrode, and a first terminal and a second terminal each included at the same position of an end of the upper electrode pattern and an end of the lower electrode pattern.

16 Claims, 16 Drawing Sheets

(56) References Cited

U.S. PATENT DOCUMENTS

2023/0272238 A1* 8/2023 Fujino .................. C08L 101/00
                                                            252/514
2025/0032311 A1* 1/2025 Rogers .................... A61F 7/12

FOREIGN PATENT DOCUMENTS

| KR | 20120045581 A | 5/2012 |
|----|---------------|--------|
| KR | 20120073140 A | 7/2012 |
| KR | 102094998 B1  | 3/2020 |

OTHER PUBLICATIONS

BKim (Kim, Bongsoo et al, "Interfacing Liquid Metals with Stretchable Metal Conductors", ACS Appl. Mater. Interfaces, 7, 15, 7920-7926, published Apr. 2, 2015, https://doi.org/10.1021/am508899z) (Year: 2015).*

Office Action in Korean Application No. 10-2023-0129015. dated Feb. 19, 2025, 4 pages.

Notice of Allowance in Korean Application No. 10-2023-0129015. dated Apr. 10, 2025, 6 pages.

\* cited by examiner

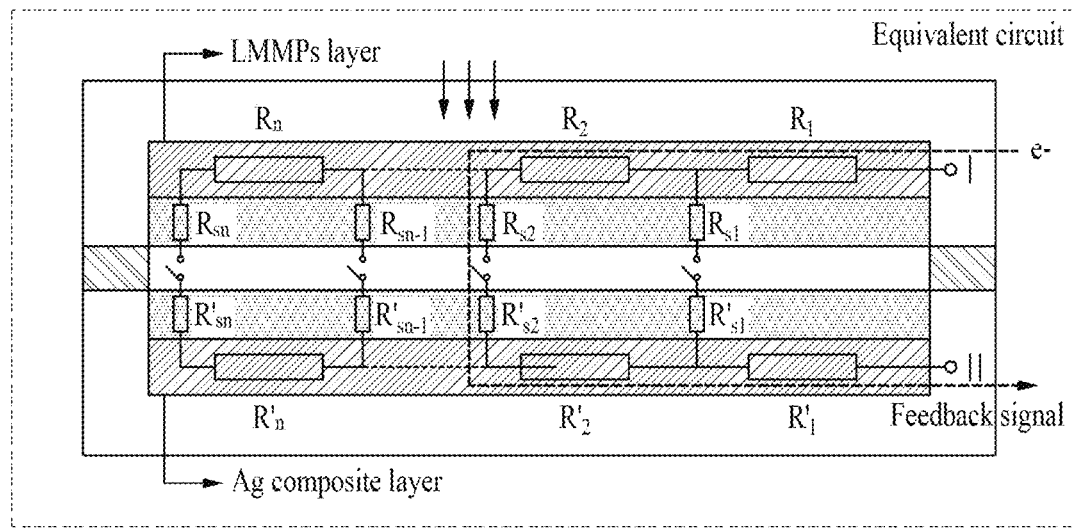
FIG. 6A
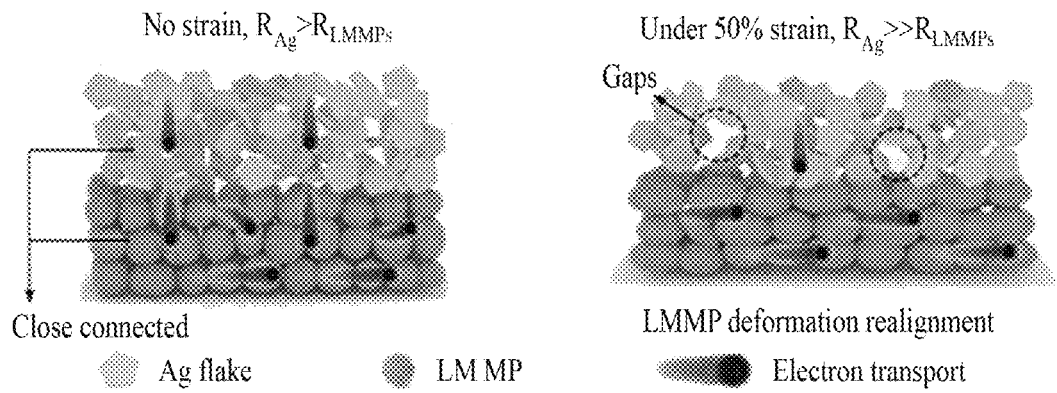
FIG. 6B    FIG. 6C

TWO-TERMINAL STRETCHABLE TOUCH ARRAY SENSOR AND METHOD OF PREPARING THE SAME

CROSS-REFERENCE TO RELATED APPLICATION

This application claims the benefit of Korean Patent Application No. 10-2023-0129015 filed on Sep. 26, 2023, in the Korean Intellectual Property Office, the entire disclosure of which is incorporated herein by reference for all purposes.

BACKGROUND

1. Field of the Invention

One or more embodiments relate to a two-terminal stretchable touch array sensor and a method of preparing the two-terminal stretchable touch array sensor.

2. Description of the Related Art

Currently, pressure sensors are used in various fields of electronic elements, robotics, and bionics. Analog signal-based pressure sensors of the related art that are influenced by contact resistance of a connecting portion and external parasitic resistance required a process of continuously calibrating a magnitude of a signal changing depending on a connection environment.

In a lot of research, deformable sensor arrays are developed using resistance, capacitance, optical and acoustic sounds, and reaction changes of ion kinetics. All of such approaches are based on direct mechanical touch on artificial skin and the types of materials in contact are not able to be distinguished. In addition, a large number of pixels are required to successively recognize a dynamic movement, which is a big technical task since it is difficult to realize large-scale integration of deformable detection pixels and the manufacture of a small chip that operates at a high frequency with low power.

In general, in a lot of research, a matrix-type tactile sensor array, in which a plurality of sensor units and electrodes are integrated, has been designed to receive touch position information. A pixelated sensor array may visualize touch stimulation, and thus obtain a touch force distribution using time-division multiple access.

A pixel-based deformable tactile sensor array of the related art constantly needs a large number of terminals used to connect all sensor units, which affects integration and deteriorates deformability. Also, in order to increase a spatial resolution, more sensor pixels are required for coupling and this increases data collection time. This implies that, particularly, in a case of recognition of a dynamic movement, real-time response detection is delayed.

The above description is information the inventor(s) acquired during the course of conceiving the present disclosure, or already possessed at the time, and is not necessarily art publicly known before the present application was filed.

SUMMARY

Embodiments provide a two-terminal stretchable touch array sensor that may easily recognize a touch position according to a local resistance signal, and receive a dynamic movement including a direction and a speed through continuous resistance signal analysis, and a method of preparing the two-terminal stretchable touch array sensor.

However, goals to be achieved are not limited to those described above, and other goals not mentioned above may be clearly understood by one of ordinary skill in the art from the following description.

According to an aspect, there is provided a two-terminal stretchable touch array sensor including an upper electrode including an upper electrode pattern embedded in a first elastic substrate, a lower electrode including a lower electrode pattern embedded in a second elastic substrate, a spacer interposed between the upper electrode and the lower electrode, and a first terminal and a second terminal each included at the same position of an end of the upper electrode pattern and an end of the lower electrode pattern.

The upper electrode pattern and the lower electrode pattern may each independently include a first electrode pattern and a second electrode pattern.

The first electrode patterns of the upper electrode pattern and the lower electrode pattern may each independently include metal flakes.

The metal flakes may include at least one selected from a group consisting of gold (Au), silver (Ag), platinum (Pt), palladium (Pd), copper (Cu), cobalt (Co), zirconium (Zr), zinc (Zn), titanium (Ti), and tin (Sn).

The second electrode patterns of the upper electrode pattern and the lower electrode pattern may each independently include conductive liquid metal microparticles (LMMPs).

The conductive LMMPs may include at least one selected from a group consisting of gallium (Ga), indium (In), tin (Sn), mercury (Hg), a eutectic gallium-indium alloy (EGaIn), a eutectic gallium-indium-tin alloy (Galinstan), gallium/lead (Ga/Pb), gallium/cadmium (Ga/Cd), gallium/bismuth (Ga/Bi), and gallium/thallium (Ga/Tl).

The upper electrode and the lower electrode may be mirror-symmetrical.

The upper electrode pattern and the lower electrode pattern may each independently extend continuously in a shape of S.

The first elastic substrate and the second elastic substrate may each independently include at least one selected from a group consisting of polydimethylsiloxane (PDMS), a fluoroelastomer, a poly(vinylidene fluoride-co-hexafluoropropylene) copolymer, thermosetting polyurethane, silicone, ecoflex, and Dragon Skin.

The spacer may be perforated in the same form as the upper electrode pattern and the lower electrode pattern.

According to another aspect, there is provided a method of preparing a two-terminal stretchable touch array sensor, the method including preparing an upper electrode including an upper electrode pattern and a lower electrode including a lower electrode pattern, preparing a spacer that is perforated in the same form as the upper electrode pattern and the lower electrode pattern, and performing assembling by interposing the spacer between the upper electrode and the lower electrode.

The preparing of the upper electrode including the upper electrode pattern and the lower electrode including the lower electrode pattern may include forming a sacrificial layer on a polymer film, forming a first electrode pattern by printing a first electrode pattern solution on the sacrificial layer, forming a second electrode pattern by printing a second electrode pattern solution on the first electrode pattern, spin-coating and curing a polymer solution on the polymer film on which the first electrode pattern and the second electrode pattern are formed, preparing each of the upper electrode and the lower electrode after removing the sacrificial layer and performing heat treatment, and forming a first terminal and a second terminal respectively on an end of the first electrode pattern of the upper electrode and an end of the first electrode pattern of the lower electrode.

The forming of the sacrificial layer on the polymer film may include forming the sacrificial layer by spin-coating at least one solution selected from a group consisting of poly acrylic acid (PAA), poly(vinylpyrrolidone) (PVP), dextran, poly(methyl methacrylate) (PMMA), and poly(vinyl alcohol) (PVA) on an oxygen plasma-treated polymer film.

The first electrode pattern solution may include metal flakes, a prepolymer, a silicone adhesive, and a solvent.

The metal flakes may include at least one selected from a group consisting of gold (Au), silver (Ag), platinum (Pt), palladium (Pd), copper (Cu), cobalt (Co), zirconium (Zr), zinc (Zn), titanium (Ti), and tin (Sn).

The prepolymer may include at least one selected from a group consisting of PDMS, a fluoroelastomer, poly(vinylidene fluoride-co-hexafluoropropylene) copolymer, thermosetting polyurethane, silicone, ecoflex, Dragon Skin, isoprene, styrene-ethylene-butylene-styrene (SEBS), styrene-butadiene-styrene (SBS), styrene-butadiene (SB), styrene-isoprene-styrene (SIS), ethylene-propylene (EPM, EPDM), and nitrile-butadiene (NB).

The silicone adhesive may include at least one selected from a group consisting of sil-poxy, silicone adhesive E-43, KE series of Shin-Etsu Chemical, and DC3140.

The solvent may include at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha.

A weight ratio of the metal flakes: prepolymer: silicone adhesive: solvent may be 9:2:1:3 to 3:2:1:3.

The second electrode pattern solution may include conductive LMMPs, a polymer, and a solvent.

The conductive LMMPs may include at least one selected from a group consisting of gallium (Ga), indium (In), tin (Sn), mercury (Hg), a eutectic gallium-indium alloy (EGaIn), a eutectic gallium-indium-tin alloy (Galinstan), gallium/lead (Ga/Pb), gallium/cadmium (Ga/Cd), gallium/bismuth (Ga/Bi), and gallium/thallium (Ga/Tl).

The polymer may include at least one selected from a group consisting of an (ethylene-vinyl acetate) copolymer (PEVA), styrene-butadiene-styrene (SBS), styrene-butadiene (SB), styrene-isoprene-styrene (SIS), a styrene-ethylene-butylene-styrene (SEBS) block copolymer, and aliphatic polyurethane.

The solvent may include at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha.

A ratio of the conductive LMMPs: polymer: solvent may be 4:1:20 to 10:1:20.

In the forming of the first electrode pattern, screen printing may be used.

The first electrode pattern solution may be printed and cured at a temperature of 50° C. to 100° C. for 30 minutes to 300 minutes.

In the forming of the second electrode pattern, nozzle printing may be used.

The nozzle printing may be a method of performing printing by fixing a distance between a nozzle and a polymer film to 10 μm to 300 μm and keeping a temperature of a printer platform and the nozzle at 50° C. to 90° C.

The spin-coating and curing of the polymer solution may include performing curing at a temperature of 50° C. to 100° C. for 60 minutes to 300 minutes.

The preparing of each of the upper electrode and the lower electrode may include removing and separating the sacrificial layer by immersing the polymer film, on which the polymer solution is cured, in deionized water for 30 to 300 minutes.

The heat treatment may be performed at a temperature of 100° C. to 200° C. for 1 hour to 12 hours.

Additional aspects of embodiments will be set forth in part in the description which follows and, in part, will be apparent from the description, or may be learned by practice of the disclosure.

A two-terminal stretchable touch array sensor according to embodiments may easily recognize a touch position according to a local resistance signal. The two-terminal stretchable touch array sensor having a two-dimensional plane structure may receive dynamic movement information including a direction and a speed through continuous resistance spike signal analysis. In addition, the two-terminal stretchable touch array sensor may operate even during stretching and bending.

By a method of preparing a two-terminal stretchable touch array sensor according to an embodiment, a two-terminal stretchable touch array sensor that may be designed in any form may be prepared based on an all-printed method.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 6A, 6B and 6C are diagrams illustrating an equivalent circuit and an operating mechanism of a two-terminal stretchable touch array sensor according to an embodiment;

DETAILED DESCRIPTION

Figure 1A:
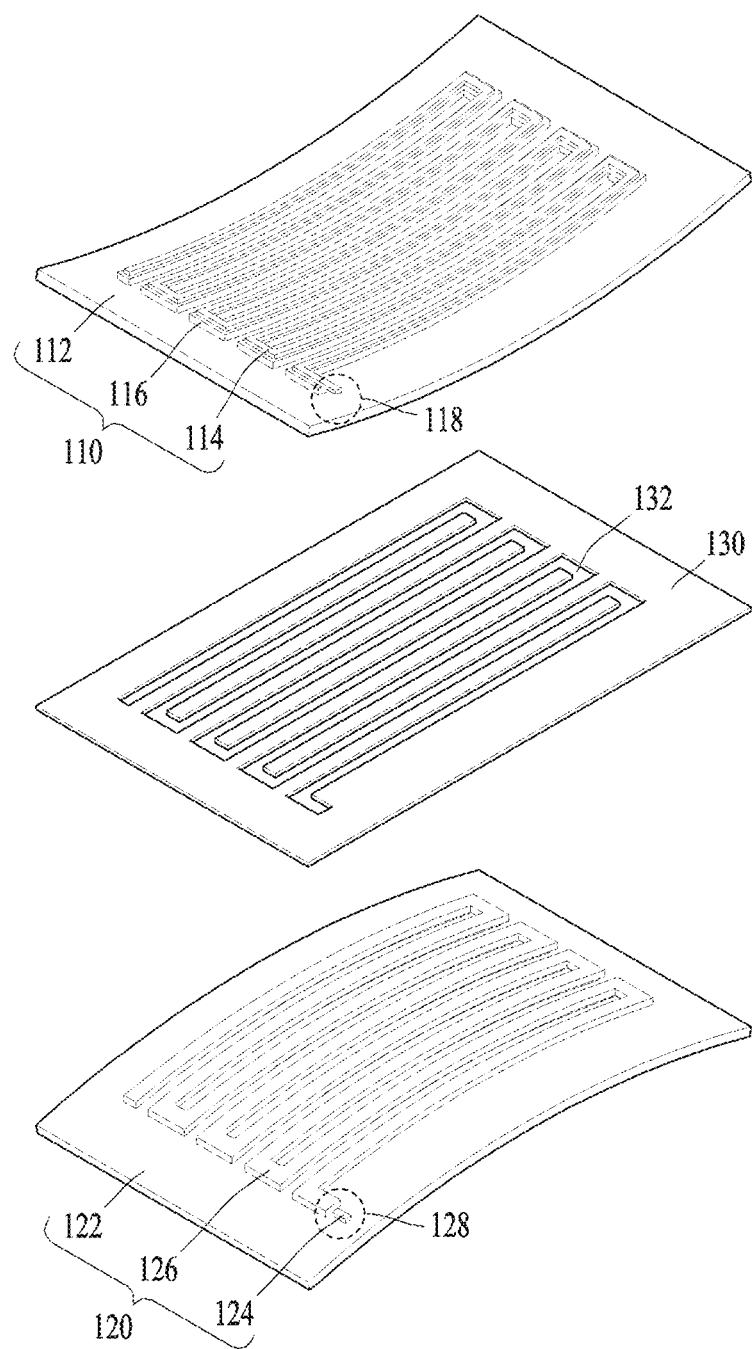
FIG. 1A is a diagram schematically illustrating a two-terminal stretchable touch array sensor according to an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In addition, when describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

In addition, the terms first, second, A, B, (a), and (b) may be used to describe components of the embodiments. These terms are used only for the purpose of discriminating one component from another component, and the nature, the sequences, or the orders of the components are not limited by the terms.

Components included in one embodiment and components having a common function will be described using the same names in other embodiments. Unless otherwise mentioned, the descriptions on the embodiments may be applicable to the following embodiments and thus, duplicated descriptions will be omitted for conciseness.

Hereinafter, a two-terminal stretchable touch array sensor and a method of preparing the two-terminal stretchable touch array sensor according to embodiments will be described in detail with reference to embodiments and drawings. However, the present disclosure is not limited to the embodiments and drawings.

A two-terminal stretchable touch array sensor according to an embodiment may include an upper electrode including an upper electrode pattern embedded in a first elastic substrate; a lower electrode including a lower electrode pattern embedded in a second elastic substrate; a spacer interposed between the upper electrode and the lower electrode; and a first terminal and a second terminal included in the same position of an end of the upper electrode pattern and an end of the lower electrode pattern, respectively.

The two-terminal stretchable touch array sensor of the present disclosure may be applied to electronic skins and static/dynamic touch sensor arrays, and is applicable to robot skin capable of recognizing a position of a stimulation and analyzing a dynamic movement stimulation in real time in the future.

Figure 1B:
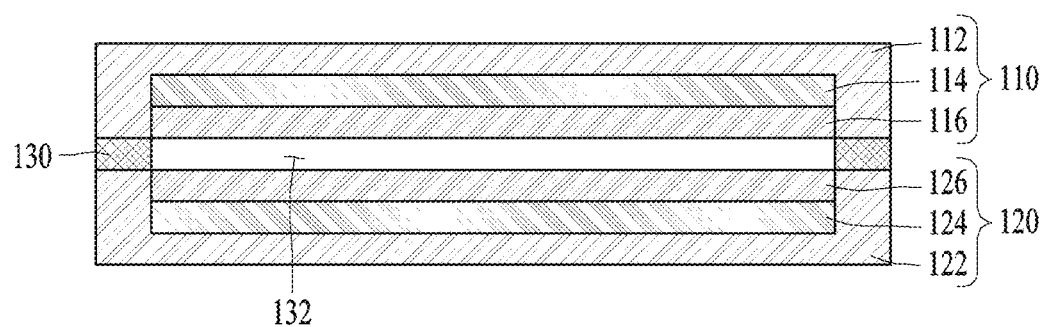
FIG. 1B is a cross-sectional view of a two-terminal stretchable touch array sensor according to an embodiment.

FIG. 1A is a diagram schematically illustrating a two-terminal stretchable touch array sensor according to an embodiment, and FIG. 1B is a cross-sectional view of the two-terminal stretchable touch array sensor according to an embodiment.

Referring to FIGS. 1A and 1B, a two-terminal stretchable touch array sensor 100 according to an embodiment of the present disclosure sequentially includes an upper electrode 110, a spacer 130, and a lower electrode 120.

The upper electrode 110 includes an upper electrode pattern 110a embedded in a first elastic substrate 112.

The lower electrode 120 includes a lower electrode pattern 120a embedded in a second elastic substrate 122.

In an embodiment, the first elastic substrate 112 and the second elastic substrate 122 may each independently include at least one selected from a group consisting of polydimethylsiloxane (PDMS), a fluoroelastomer, a poly (vinylidene fluoride-co-hexafluoropropylene) copolymer, thermosetting polyurethane, silicone, ecoflex, and Dragon Skin.

In an embodiment, the upper electrode pattern 110a and the lower electrode pattern 120a may each independently include first electrode patterns 114 and 124 and second electrode patterns 116 and 126.

In an embodiment, the first electrode patterns 114 and 124 of the upper electrode pattern 110a and the lower electrode pattern 120a may each independently include metal flakes.

In an embodiment, the metal flakes may include at least one selected from a group consisting of gold (Au), silver (Ag), platinum (Pt), palladium (Pd), copper (Cu), cobalt (Co), zirconium (Zr), zinc (Zn), titanium (Ti), and tin (Sn).

Desirably, silver (Ag) flakes may be used for the metal flakes.

In an embodiment, the second electrode patterns 116 and 126 of the upper electrode pattern 110a and the lower electrode pattern 120a may each independently include conductive liquid metal microparticles (LMMPs).

In an embodiment, the conductive LMMPs may include at least one selected from a group consisting of gallium (Ga), indium (In), tin (Sn), mercury (Hg), a eutectic gallium-indium alloy (EGaln), a eutectic gallium-indium-tin alloy (Galinstan), gallium/lead (Ga/Pb), gallium/cadmium (Ga/Cd), gallium/bismuth (Ga/Bi), and gallium/thallium (Ga/Tl).

Desirably, the eutectic gallium-indium-tin alloy (Galinstan) may be used for the conductive LMMPs.

In an embodiment, the upper electrode 110 and the lower electrode 120 may be mirror-symmetrical.

The upper electrode pattern 110a and the lower electrode pattern 120a may face each other with the spacer 130 interposed therebetween. Accordingly, the second electrode pattern 116 of the upper electrode 110 and the second electrode pattern 126 of the lower electrode 120 may be symmetrical about the spacer 130.

In an embodiment, the upper electrode pattern 110a and the lower electrode pattern 120a may each independently extend continuously in a shape of S.

Accordingly, the upper electrode pattern 110a and the lower electrode pattern 120a may each linearly extend.

The two-terminal stretchable touch array sensor 100 includes a first terminal 118 and a second terminal 128 each included at the same position of an end of the upper electrode pattern 110a and an end of the lower electrode pattern 120a.

In an embodiment, the spacer 130 may be perforated in the same form as the upper electrode pattern 110a and the lower electrode pattern 120a. Accordingly, an empty space may be formed in the same form as the upper electrode pattern 110a and the lower electrode pattern 120a.

In an embodiment, the spacer 130 may include at least one selected from a group consisting of PDMS, a fluoroelastomer, a poly (vinylidene fluoride-co-hexafluoropropylene) copolymer, thermosetting polyurethane, silicone, ecoflex, and Dragon Skin.

Desirably, the spacer 130 may be PDMS.

The upper electrode pattern 110a and the lower electrode pattern 120a may be spaced apart from each other due to the spacer 130, and the upper electrode pattern 110a and the lower electrode pattern 120a may come into contact with each other by touch of the upper electrode 110.

The two-terminal stretchable touch array sensor according to an embodiment of the present disclosure may easily recognize a touch position according to a local resistance signal. The two-terminal stretchable touch array sensor having a two-dimensional (2D) plane structure may receive dynamic movement information including a direction and a speed through continuous resistance spike signal analysis. In addition, the two-terminal stretchable touch array sensor may operate even during stretching and bending.

A method of preparing a two-terminal stretchable touch array sensor according to another embodiment of the present disclosure may include preparing an upper electrode including an upper electrode pattern and a lower electrode including a lower electrode pattern, preparing a spacer that is perforated in the same form as the upper electrode pattern and the lower electrode pattern, and performing assembling by interposing the spacer between the upper electrode and the lower electrode.

In an embodiment, the preparing of the upper electrode including the upper electrode pattern and the lower electrode including the lower electrode pattern may include forming a sacrificial layer on a polymer film, forming a first electrode pattern by printing a first electrode pattern solution on the sacrificial layer, forming a second electrode pattern by printing a second electrode pattern solution on the first electrode pattern, spin-coating a polymer solution on the polymer film on which the first electrode pattern and the second electrode pattern are formed, and curing the polymer solution, preparing each of the upper electrode and the lower electrode after removing the sacrificial layer and performing heat treatment, and forming a first terminal and a second terminal respectively on an end of the first electrode pattern of the upper electrode and an end of the first electrode pattern of the lower electrode.

Figure 2A:
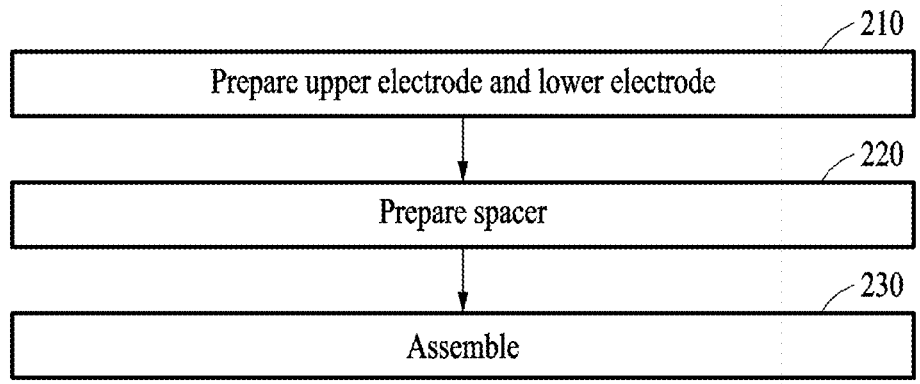
FIG. 2A is a flowchart illustrating a method of preparing a two-terminal stretchable touch array sensor according to an embodiment.
Figure 2B:
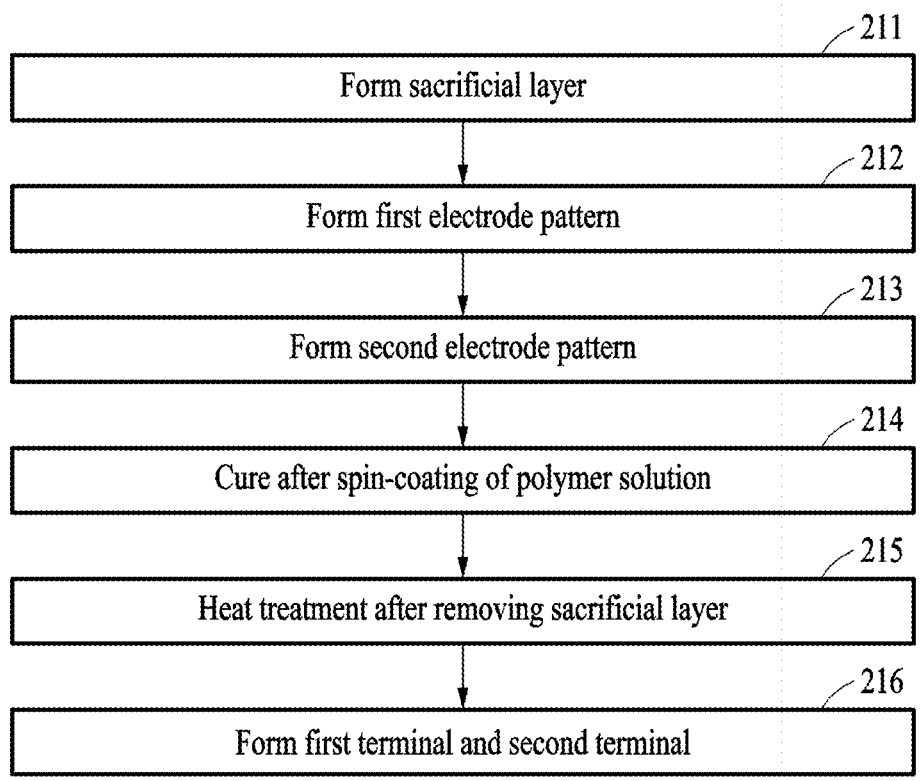
FIG. 2B is a flowchart specifically illustrating step of preparing an upper electrode and a lower electrode of FIG. 2A.

FIG. 2A is a flowchart illustrating a method of preparing a two-terminal stretchable touch array sensor according to an embodiment, and FIG. 2B is a flowchart specifically illustrating step of preparing an upper electrode and a lower electrode of FIG. 2A.

Referring to FIG. 2A, the method of preparing the two-terminal stretchable touch array sensor according to an embodiment of the present disclosure includes step 210 of preparing an upper electrode and a lower electrode, step 220 of preparing a spacer, and step 230 of assembling.

Referring to FIG. 2B, step 210 of preparing the upper electrode and the lower electrode may include step 211 of forming a sacrificial layer, step 212 of forming a first electrode pattern, step 213 of forming a second electrode pattern, step 214 of spin-coating and curing a polymer solution, step 215 of removing the sacrificial layer and performing heat treatment, and step 216 of forming a first terminal and a second terminal.

Step 211 of forming the sacrificial layer is step of forming a sacrificial layer on a polymer film.

In an embodiment, step 211 of forming the sacrificial layer on the polymer film may include forming the sacrificial layer by spin-coating at least one solution selected from a group consisting of poly acrylic acid (PAA), poly(vinylpyrolidone) (PVP), dextran, poly(methyl methacrylate) (PMMA), and poly(vinyl alcohol) (PVA) on an oxygen plasma-treated polymer film.

Desirably, PAA may be used.

The polymer film may include at least one selected from a group consisting of polyethylene terephthalate (PET), polyethylene naphthalate (PEN), polyether sulfone (PES), polyimide (PI), polyarylate (PAR), polycarbonate (PC), PMMA, and cycloolefin copolymer (COC).

Step 212 of forming the first electrode pattern may include forming the first electrode pattern by printing a first electrode pattern solution on the sacrificial layer.

In an embodiment, the first electrode pattern solution may include metal flakes, a prepolymer, a silicone adhesive, and a solvent.

In an embodiment, the metal flakes may include at least one selected from a group consisting of gold (Au), silver (Ag), platinum (Pt), palladium (Pd), copper (Cu), cobalt (Co), zirconium (Zr), zinc (Zn), titanium (Ti), and tin (Sn).

Desirably, silver (Ag) flakes may be used for the metal flakes.

In an embodiment, the prepolymer may include at least one selected from a group consisting of PDMS, a fluoroelastomer, poly (vinylidene fluoride-co-hexafluoropropylene) copolymer, thermosetting polyurethane, silicone, ecoflex, Dragon Skin, isoprene, styrene-ethylene-butylene-styrene (SEBS), styrene-butadiene-styrene (SBS), styrene-butadiene (SB), styrene-isoprene-styrene (SIS), ethylene-propylene (EPM, EPDM), and nitrile-butadiene (NB).

Desirably, the prepolymer may be PDMS or isoprene.

In an embodiment, the silicone adhesive may include at least one selected from a group consisting of sil-poxy, silicone adhesive E-43, KE series of Shin-Etsu Chemical, and DC3140.

In an embodiment, the solvent may include at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha.

Desirably, heptane may be used for the solvent.

In an embodiment, a weight ratio of the metal flakes: prepolymer: silicone adhesive: solvent may be 9:2:1:3 to 3:2:1:3.

A weight ratio of the metal flakes: prepolymer: silicone adhesive may be 1.2:1 to 5:1.

In an embodiment, in step of forming the first electrode pattern, screen printing may be used.

The first electrode pattern may be formed by screen-printing the first electrode pattern solution on a polymer substrate treated with at least one solution selected from a group consisting of PAA, PVP, dextran, PMMA, and PVA using screen printing mesh.

In an embodiment, the first electrode pattern solution may be printed and then cured at a temperature of 50° C. to 100° C. for 30 to 300 minutes.

Desirably, the first electrode pattern solution may be cured at 80° C. for 60 minutes.

Step 213 of forming the second electrode pattern may include forming the second electrode pattern by printing a second electrode pattern solution on the first electrode pattern.

In an embodiment, the second electrode pattern solution may include conductive LMMPs, a polymer, and a solvent.

In an embodiment, the conductive LMMPs may include at least one selected from a group consisting of gallium (Ga), indium (In), tin (Sn), mercury (Hg), EGaIn, a eutectic gallium-indium-tin alloy (Galinstan), gallium/lead (Ga/Pb), gallium/cadmium (Ga/Cd), gallium/bismuth (Ga/Bi), and gallium/thallium (Ga/Tl).

Desirably, the EGaIn may be used for the conductive LMMPs.

In an embodiment, the polymer may include at least one selected from a group consisting of an (ethylene-vinyl acetate) copolymer (PEVA), styrene-butadiene-styrene (SBS), styrene-butadiene (SB), styrene-isoprene-styrene (SIS), a styrene-ethylene-butylene-styrene (SEBS) block copolymer, and aliphatic polyurethane.

Desirably, the (ethylene-vinyl acetate) copolymer (PEVA) may be used for the polymer.

In an embodiment, the solvent may include at least one selected from a group consisting of acetone, cyclohexane, chloroform, 1,2-dichloroethane, toluene, trichloroethane, trichlorobenzene, benzene carbon tetrachloride, chlorobenzene, THF, xylene, tertiary butyl acetate, heptane, hexane, dimethyl ether, 2-butanone, methanol, butanone, and naphtha. Desirably, toluene may be used for the solvent.

In an embodiment, a ratio of the conductive LMMPs: polymer: solvent may be 4:1:20 to 10:1:20.

In an embodiment, in step of forming the second electrode pattern, nozzle printing may be used.

The conductive liquid metal may be a liquid at room temperature. Accordingly, heating or distribution through a solvent is not necessary in the printing. In addition, the liquid metal may maintain the liquid state even after the printing when the printed substrate maintains room temperature. Accordingly, a second electrode pattern that may be freely deformed almost infinitely when applied to a three-dimensional printer may be formed.

In an embodiment, the nozzle printing may be a method of performing printing by fixing a distance between a nozzle and a polymer film to 10 μm to 300 μm and keeping a temperature of a printer platform and the nozzle at 50° C. to 90° C.

Desirably, the nozzle printing may be a method of performing printing by setting a nozzle diameter to 100 μm to 200 μm, setting a pressure to 80 kPa to 180 kPa, fixing a distance between the nozzle and a PET film to 100 μm to 200 μm, and keeping the temperature of the printer platform and the nozzle at 60° C. to 80° C.

Step 214 of spin-coating and curing the polymer solution may include spin-coating and curing a polymer solution on the polymer film on which the first electrode pattern and the second electrode pattern are formed.

The polymer solution may include a polymer and a curing agent.

The polymer may include at least one selected from a group consisting of PDMS, a fluoroelastomer, a poly (vinylidene fluoride-co-hexafluoropropylene) copolymer, thermosetting polyurethane, silicone, ecoflex, and Dragon Skin.

Desirably, PDMS may be used for the polymer.

In an embodiment, step of spin-coating and curing the polymer solution may include curing the polymer solution at a temperature of 50° C. to 100° C. for 60 to 300 minutes.

Desirably, the curing may be performed at 80° C. for 120 minutes.

Step 215 of removing the sacrificial layer and performing heat treatment may include preparing each of an upper electrode and a lower electrode by removing the sacrificial layer and performing the heat treatment.

Each of the upper electrode and the lower electrode may be prepared by disposing the upper electrode and the lower electrode to be spaced apart from each other due to a spacer in the two-terminal stretchable touch array sensor and forming the upper electrode and the lower electrode by the same method to be mirror-symmetrical in the same form.

In an embodiment, step of preparing each of the upper electrode and the lower electrode may include removing and separating the sacrificial layer by immersing the polymer film, on which the polymer solution is cured, in deionized water for 30 to 300 minutes.

Step 216 of forming the first terminal and the second terminal may include forming the first terminal and the second terminal respectively on an end of the first electrode pattern of the upper electrode and an end of the first electrode pattern of the lower electrode.

In an embodiment, the heat treatment may be performed at a temperature of 100° C. to 200° C. for 1 hour to 12 hours.

Desirably, the heat treatment may be performed at 120° C. to 8 hours.

The upper electrode and the lower electrode may be prepared as described above.

Step 220 of preparing the spacer may include preparing a spacer that is perforated in the same form as the upper electrode pattern and the lower electrode pattern.

The spacer may be cut into the same form as the upper electrode pattern and the lower electrode pattern using a cutter to form an empty space.

Step 230 of assembling may include performing assembling by interposing the spacer between the upper electrode and the lower electrode.

The assembling may be performed to obtain the two-terminal stretchable touch array sensor including the upper electrode, the spacer, and the lower electrode sequentially from the top.

By the method of preparing the two-terminal stretchable touch array sensor according to an embodiment of the present disclosure, a two-terminal stretchable touch array sensor that may be designed in any form may be prepared based on an all-printed method.

Hereinafter, the present disclosure will be described in detail with reference to examples and comparative examples below. However, technical ideas of the present disclosure is not limited thereto.

EXAMPLES

In an embodiment of the present disclosure, the all-printed preparation method for designing a two-terminal stretchable touch array sensor has been developed. A double-contact mechanism-based touch sensor may distinguish static touch positions, and recognize a dynamic movement depending on the resistance spike change with low response lag.

Preparation of Ag/PDMS Composite Ink

Ag flakes, a PDMS prepolymer, sil-poxy, isoprene, and heptane were mixed at a weight ratio of 6:2:1:1.5:1.5 using a vertex mixer at 1000 rpm for 10 minutes, and then sonicated for 1 hour to prepare a uniform Ag ink. The treatment was performed at 1000 rpm for 10 minutes, and then ultrasonication was performed for 1 hour to prepare a uniform Ag ink. The ratio of the Ag flakes and the polymer (the PDMS prepolymer and sil-poxy) may be 2:1, 1.5:1, and 3:1.

Preparation of eGaIn LM Ink

Poly(ethylene-co-vinyl acetate) (PEVA) (0.2 g) was dissolved in toluene (5 ml) at 80° C. by constant stirring for 12 hours, then eGaIn was added as 0.8 g of LM into a PEVA solution. The mixed solution was sonicated for 15 minutes to prepare an LM ink. The sonicated solution was used as an ink for nozzle printing.

Preparation of Ag/LMMPs Stretchable Electrode

Figure 3:
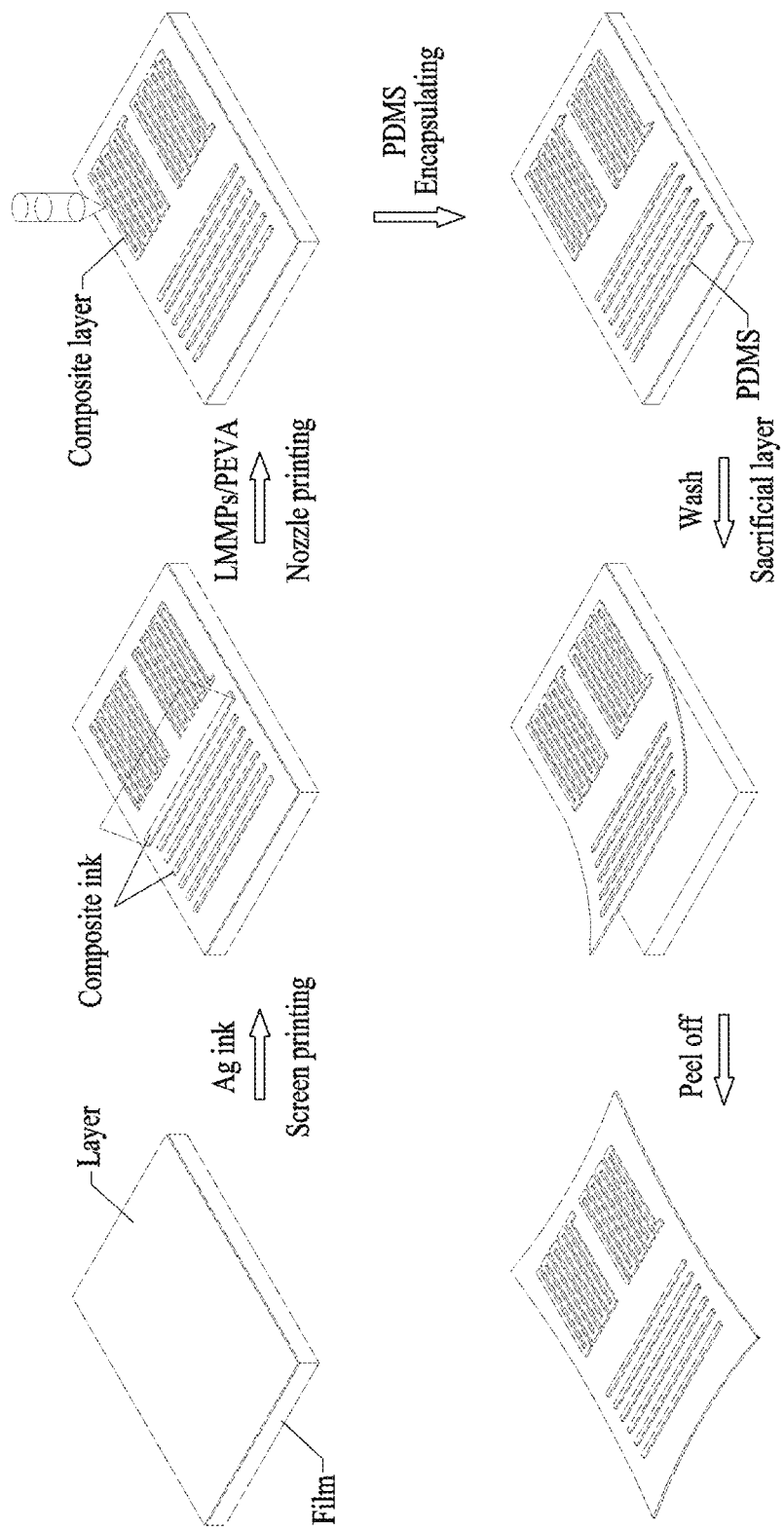
FIG. 3 is a schematic view of an operation of preparing a Ag/liquid metal microparticles (LMMPs) stretchable electrode according to an embodiment.

FIG. 3 is a schematic view of an operation of preparing a LMMPs stretchable electrode according to an embodiment.

Referring to FIG. 3, first, a PET film (250 μm) was selected as a substrate for screen printing, and a PAA solution (5 to 10 wt. % in DI water) was spin-coated on an oxygen plasma treated PET film at 1000 rpm for 30 seconds to prepare a PAA layer-coated PET film. The Ag ink was screen-printed on the PAA-treated PET substrate using a polyester screen-printing mesh.

In an embodiment of the present disclosure, stencils with two different patterns were used.

Figure 4A:
FIGS. 4A and 4B are diagrams illustrating a structure of stencils with two patterns according to an embodiment.
Figure 4B:
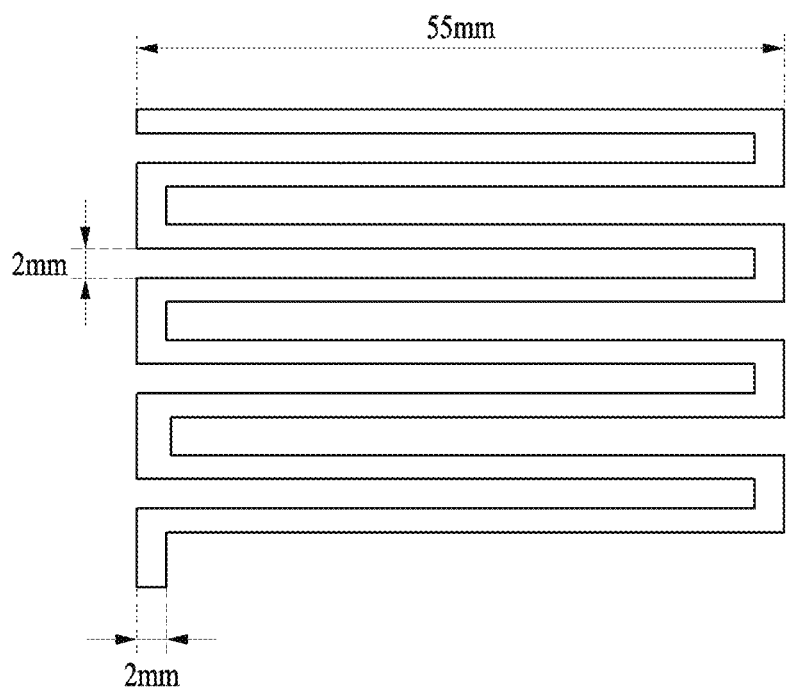

FIGS. 4A and 4B are diagrams illustrating a structure of stencils with two patterns according to an embodiment.

Referring to FIGS. 4A and 4B, stencils with a stripe pattern (4A) with a horizontal length of 100 mm and a width of 2 mm and a multiple S pattern (4B) formed in a S-shape with a horizontal length of 55 mm, a width of 2 mm, and a spacing of 2 mm are illustrated.

After cured at 80° C. for 1 hour, a PET coated with different Ag patterns was prepared. The LM ink was printed on the middle of a Ag/PDMS composite layer of the PET film by a nozzle printer. A nozzle diameter was 100 μm to 200 μm and a pressure was set to 80 kPa to 180 kPa. A distance between the nozzle and the PET film was fixed to 100 μm to 200 μm. A temperature of a printer platform and the nozzle was kept at 60° C. to 80° C. After nozzle printing, PDMS (prepolymer: curing agent=10:1, w/w) was spin-coated on the PET film at 350 rpm for 30 seconds. After cured at 80° C. for 2 hours, the PET encapsulated by PDMS was immersed into the DI water for 1 hour to wash a PAA sacrificial layer. Then, the PET film was easily detached from the PDMS layer. Finally, a stretchable Ag/LMMPs double layer electrode was prepared after performing heat treatment at 120° C. for 8 hours.

Assembly of Two-Terminal Stretchable Array Sensor

Figure 5:
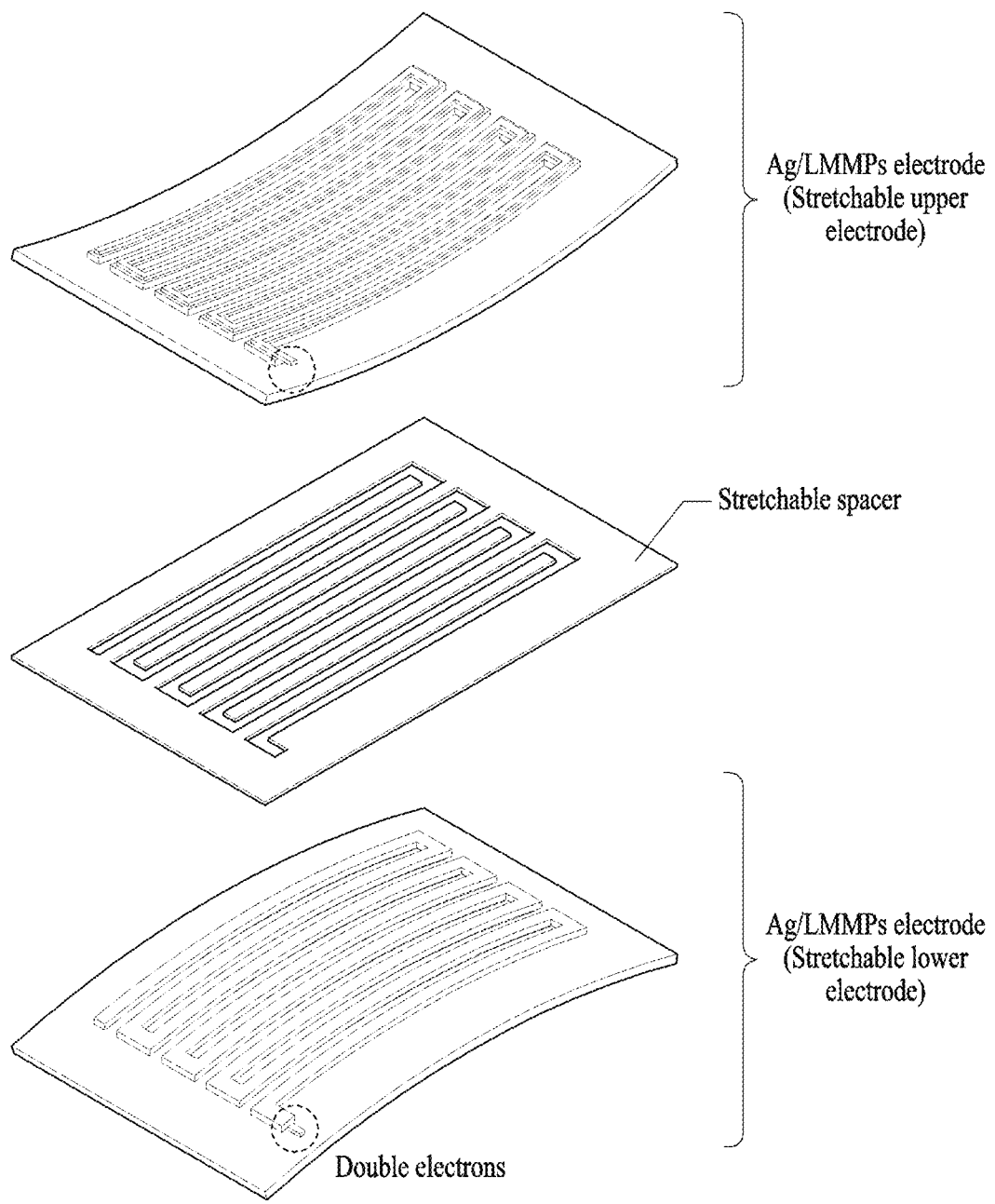
FIG. 5 is a diagram illustrating a structure of a two-terminal stretchable touch array sensor according to an embodiment.

FIG. 5 is a diagram illustrating a structure of a two-terminal stretchable touch array sensor according to an embodiment.

As shown in FIG. 5, the two-terminal stretchable touch array sensor was assembled by two mirror-symmetrical Ag/LM stretchable electrodes and an elastic spacer. Specifically, PDMS (10:1) was spin-coated on the PET film at a certain of speed for 30 seconds. A thickness of the spacer may be controlled by a spin-coating speed. The elastic spacer was cut into the same pattern as the Ag/LMMPs electrode using a cutting printer. Two terminals were attached to end portions of LMMPs lines of two mirror-symmetrical Ag/LMMPs samples, respectively. Finally, the two mirror-symmetrical Ag/LMMPs samples were face-to-face glued together with the elastic spacer therebetween to assemble into a stretchable array sensor. The electrodes were attached on the end positions of both layers.

EXAMPLE

FIGS. 6A, 6B and 6C are diagrams illustrating an equivalent circuit and an operating mechanism of a two-terminal stretchable touch array sensor according to an embodiment.

FIG. 6A shows the equivalent circuit and a side structure of the touch sensor. In this design, upper and lower Ag/LMMPs electrodes which are separated by one stretchable spacer are in a non-contact state when there is no external stimuli. It implies that no current flows through the sensor. When a mechanical touch is applied on a sensor device surface, the upper and lower Ag/LMMPs contact with each other at a touch position. Therefore, the current flows in from a first terminal, passes through the touch position, and finally flows to a second terminal. A corresponding switch is closed so that there is a corresponding response resistance. The resistance may be defined as Equation 1 below.

$$R_f \sum_{i=1}^{n}(R_1 + R_{s1} + R'_{s1} + R'_1 \cdots + R'_{sn} + R'_n) \quad \text{[Equation 1]}$$

Here, $R_i$ and $R'_i$ are unit resistance of upper and lower LMMPs electrodes, and $R_{si}$ and $R'_{si}$ are the unit resistance of upper and lower Ag/PDMS electrodes, respectively. The unit resistance of Ag/PDMS electrodes may be negligible in a vertical direction compared with the unit resistance of LMMPs electrode.

The LMMPs electrode works as a main conductive path while a Ag/polymer composite electrode works as a contact layer whether stretched or unstretched because the resistance of the Ag/polymer is larger than the resistance of the LMMPs electrode in the horizontal direction by adjusting the ratio of Ag and the polymer (FIGS. 6B and 6C).

Figure 7:
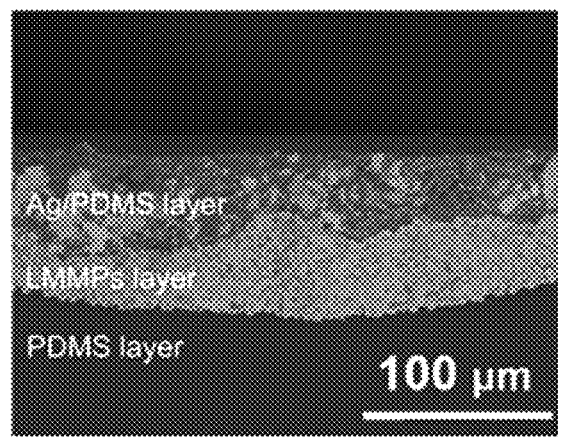
FIG. 7 illustrates a cross-sectional scanning electron microscope (SEM) image of a Ag/LMMPs electrode configured with three layers of a two-terminal stretchable touch array sensor according to an embodiment.

FIG. 7 illustrates a cross-sectional scanning electron microscope (SEM) image of a Ag/LMMPs electrode configured with three layers of a two-terminal stretchable touch array sensor according to an embodiment.

Referring to FIG. 7, the three layers are an outer Ag/PDMS layer, a middle LMMPs layer, and a PDMS substrate. As known, LM is a liquid at room temperature due to its unique property. Thus, the leakage problem always limits the further application. By using this design, the outer Ag/PDMS layer may work as a protective layer which may avoid the leakage of eGaIn LM.

Figure 8:
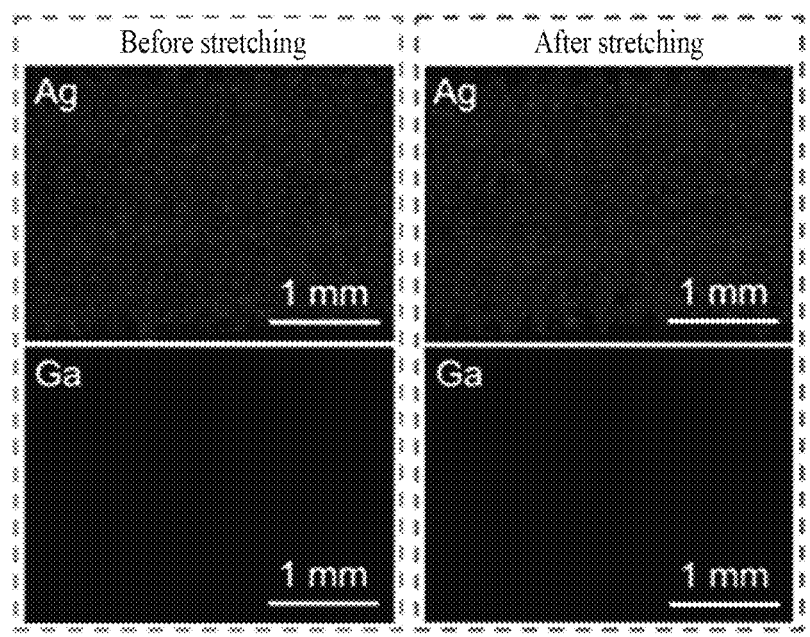
FIG. 8 illustrates a result of an energy dispersive spectroscopy (EDS) mapping of a two-terminal stretchable touch array sensor according to an embodiment.

FIG. 8 illustrates a result of an energy dispersive spectroscopy (EDS) mapping of a two-terminal stretchable touch array sensor according to an embodiment.

Referring to FIG. 8, it proves that no leakage problem occurs because there is no Ga element that may be observed after stretching.

Figure 9:
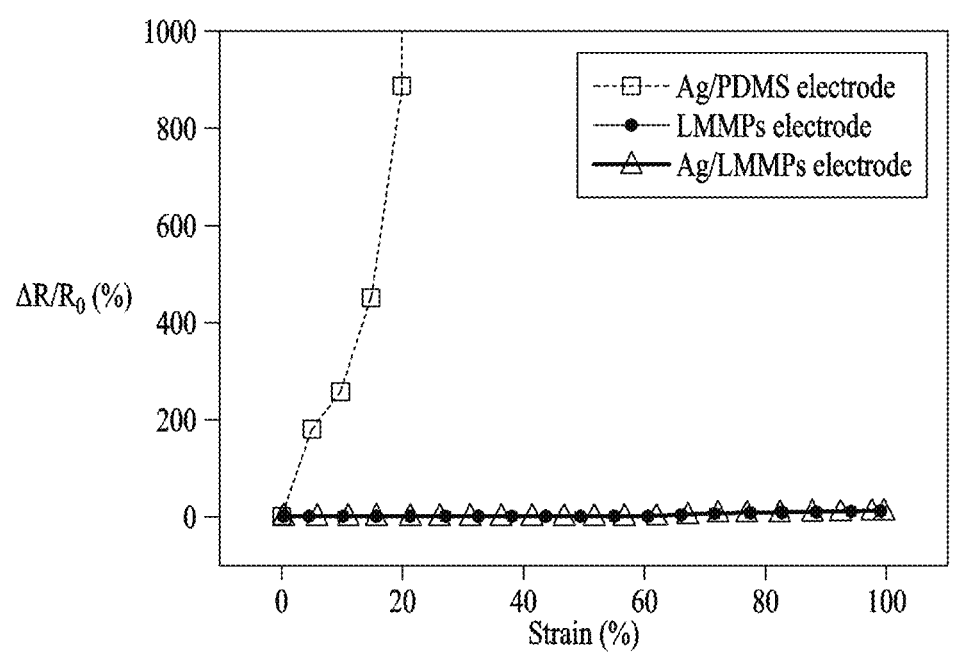
FIG. 9 illustrates a graph for comparing relative resistance changes of a Ag/PDMS electrode, a LMMPs electrode, and a Ag/LMMPs electrode of a two-terminal stretchable touch array sensor according to an embodiment.

FIG. 9 illustrates a graph for comparing relative resistance changes of a Ag/PDMS electrode, a LMMPs electrode, and a Ag/LMMPs electrode of a two-terminal stretchable touch array sensor according to an embodiment.

Since the LMMPs may deform themselves and stay connected to each other, conductive stability is performed during stretching while gaps between Ag flakes in the Ag/PDMS electrode increase thereby worsening the stability. However, in the Ag/LMMPs electrode, LMMPs line is a main conductive path, thus ensuring the conductive stability during stretching.

Figure 10A:
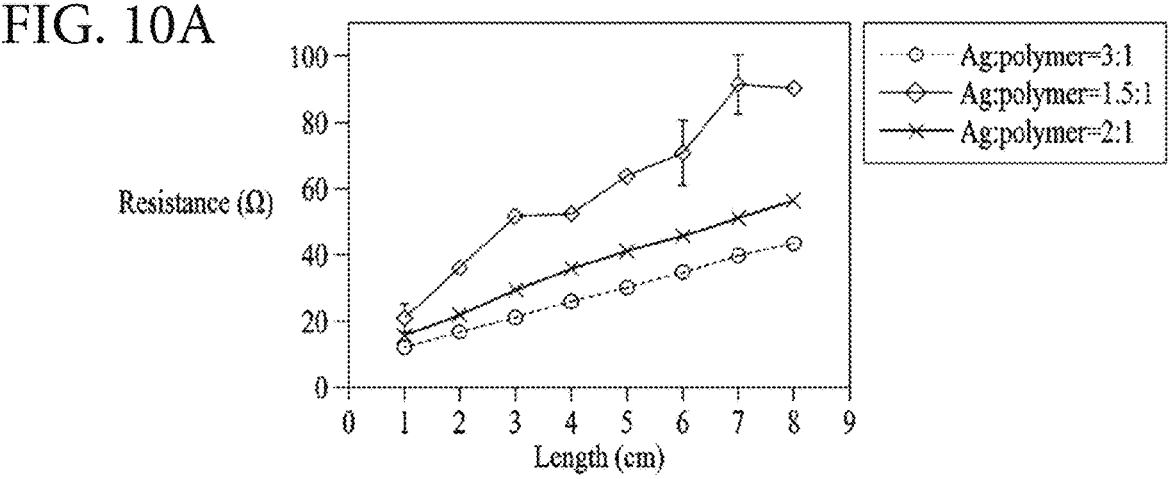
FIGS. 10A, 10B and 10C illustrate graphs showing effects of a ratio of Ag and a polymer, a spacer thickness, and width on sensing performance of a two-terminal stretchable touch array sensor according to an embodiment.
Figure 10B:
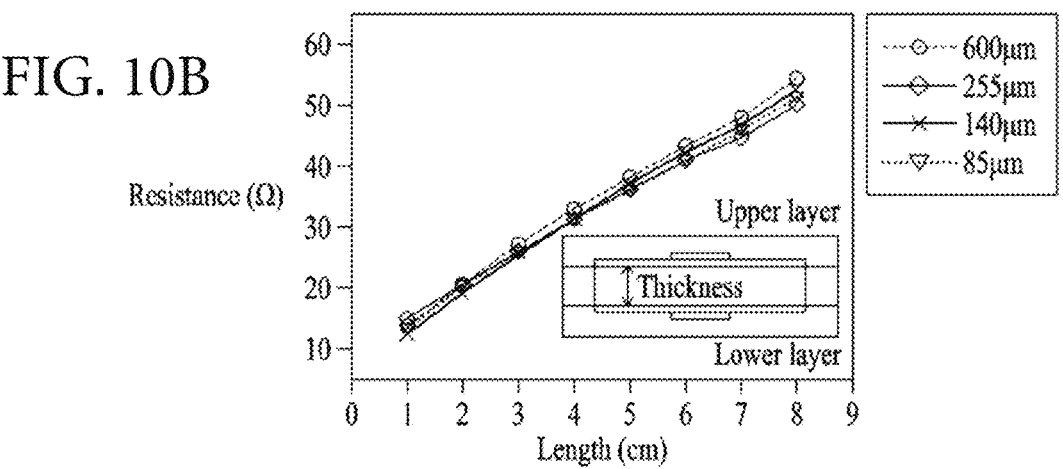
Figure 10C:
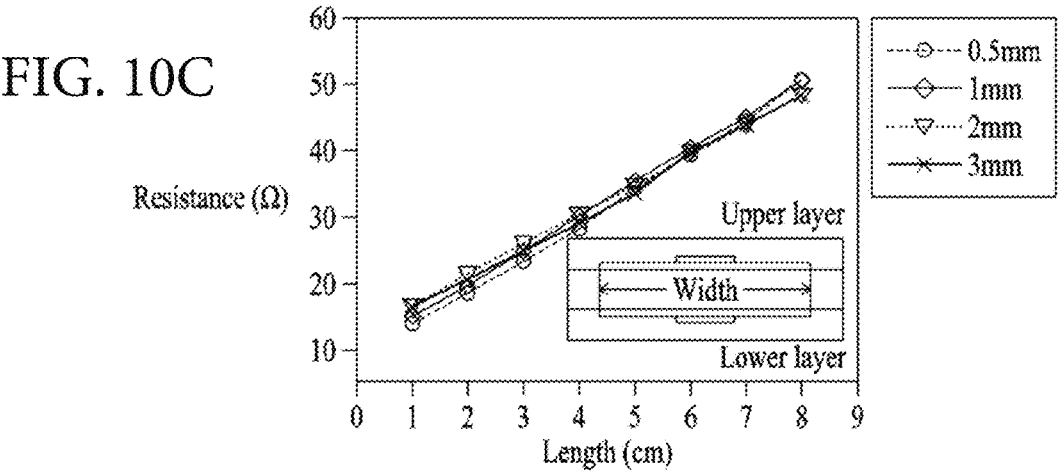

FIGS. 10A, 10B and 10C illustrate graphs showing effects of a ratio of Ag and a polymer, a spacer thickness, and width on sensing performance of a two-terminal stretchable touch array sensor according to an embodiment.

A strip touch sensor was designed using the pattern of a rectangle mentioned above with a length of 10 cm and a width of 2 mm. The effect of ratio between Ag and a polymer on a relationship between response resistance and a length from the electrode has been researched (this is defined as a position). When the ratio of Ag and the polymer is 1.5:1, it is found that the relationship is random. After increased to 2:1 and 3:1, the resistance is linear with the length (FIG. 10A). This is because more polymer affects a uniform distribution of silver flakes in a polymer matrix. The uniform resistance distribution is the key to recognize stimuli positions. In addition, the spacer thickness and width make no effect on the touching position recognition (FIGS. 10B and 10C).

Figure 11:
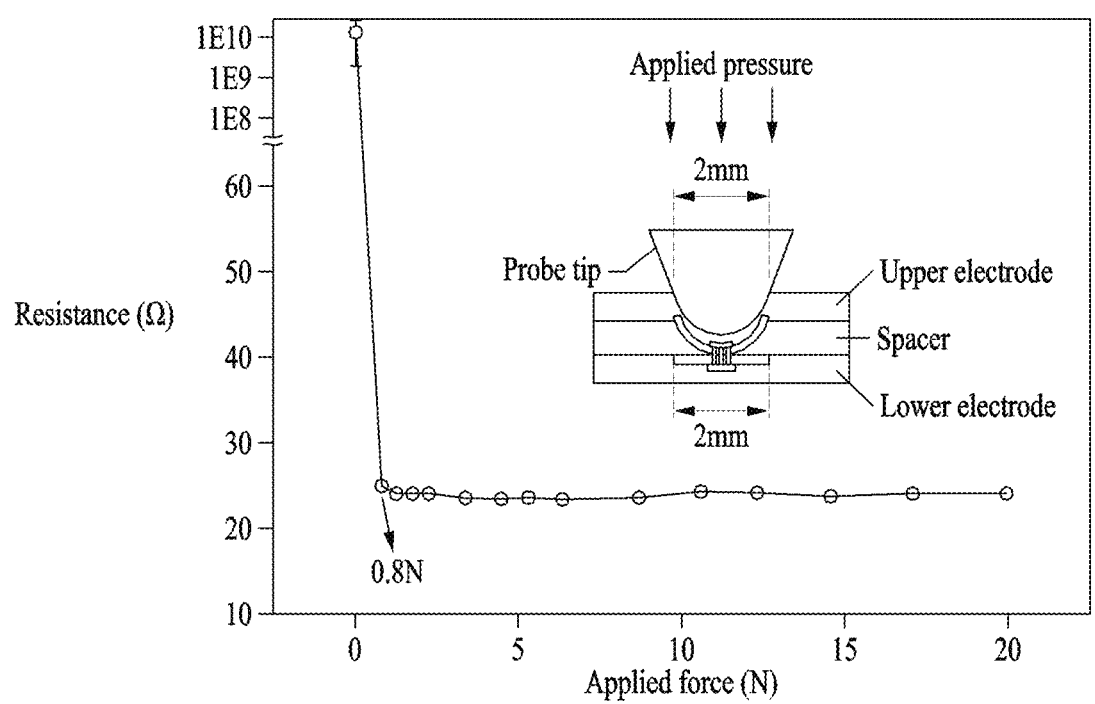
FIG. 11 illustrates resistance according to an applied force of a two-terminal stretchable touch array sensor according to an embodiment.

FIG. 11 illustrates resistance according to an applied force of a two-terminal stretchable touch array sensor according to an embodiment.

A hemispherical probe having a diameter of 2 mm was used as a pressure source. The touch sensor responded only when the pressure was 0.8 N. It is worth noting that the resistance does not change even when the applied force increases. It implies that the resistance is insensitive to the pressure.

Figure 12A:
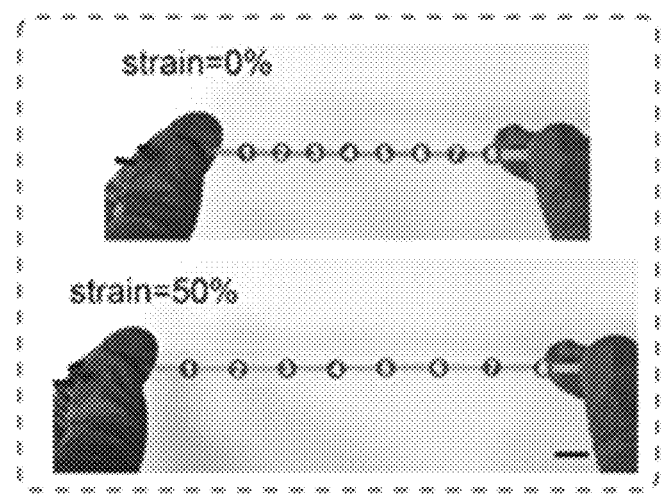
FIGS. 12A, 12B and 12C are diagrams illustrating position sensing performance of a two-terminal stretchable touch array sensor according to an embodiment.
Figure 12B:
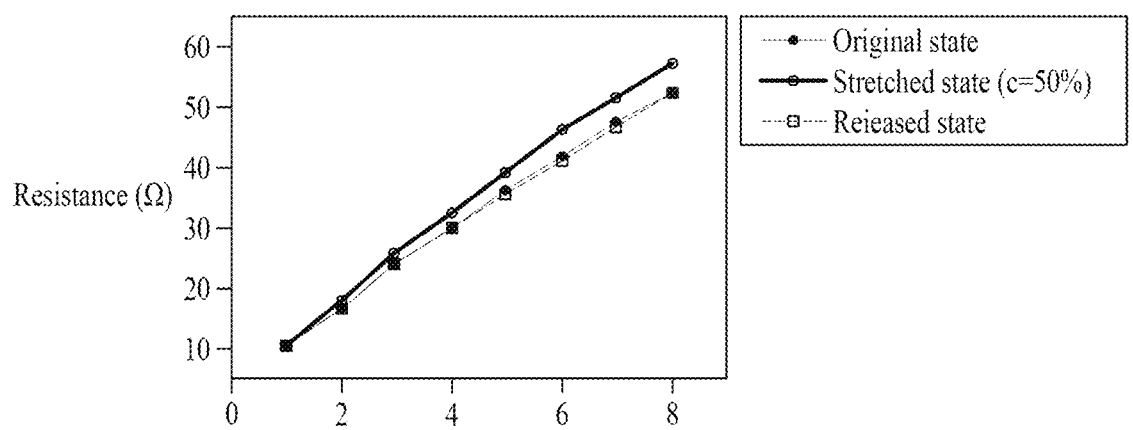
Figure 12C:
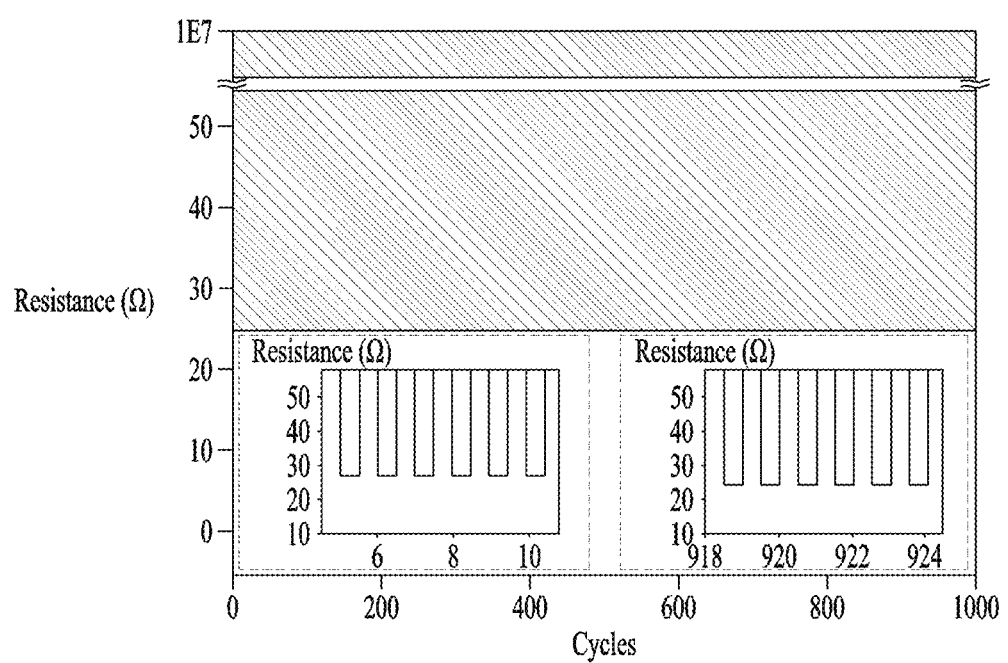

FIGS. 12A, 12B and 12C are diagrams illustrating position sensing performance of a two-terminal stretchable touch array sensor according to an embodiment. The effect of stretching on the position sensing has been evaluated in FIGS. 12A, 12B and 12C.

Eight positions on the strip touch sensor with a gap of 1 cm were marked. At strain of 50%, a gap between each position is increased to 1.5 cm. The eight positions are touched stepwise in an original state, a stretched state, and a released state, respectively. It was found that a response signal in the original state and the released state almost overlapped and the resistance of each corresponding position in the stretched state was very small. FIG. 12C shows that there is no performance degradation in the strip touch sensor at strain of 50% during the process of 1000 consecutive contacts.

FIGS. 13A to 13E are diagrams illustrating a static touch and a dynamic movement of a 2D plane sensor array of a two-terminal stretchable touch array sensor according to an embodiment.

Figure 13A:
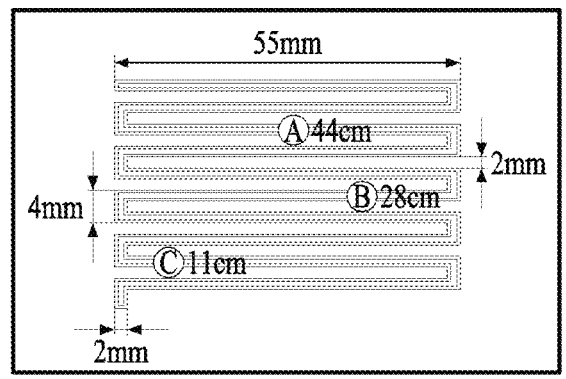
FIGS. 13A to 13E are diagrams illustrating a static touch and a dynamic movement of a 2D plane sensor array of a two-terminal stretchable touch array sensor according to an embodiment.
Figure 13B:
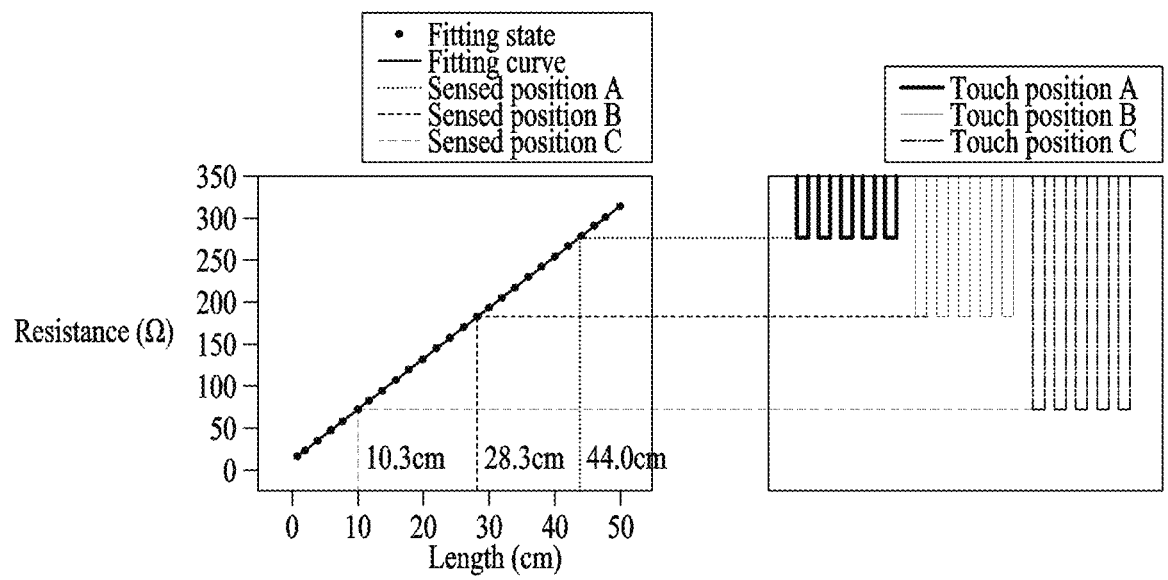
Figure 13C:
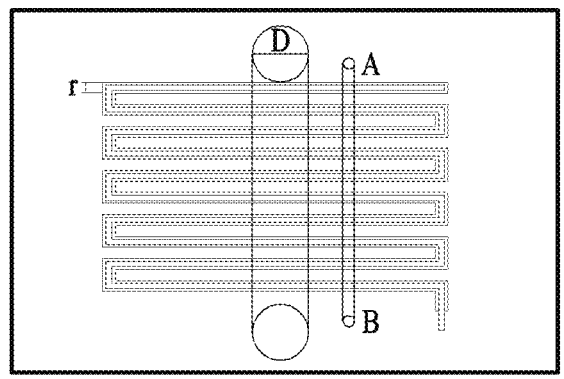
Figure 13D:
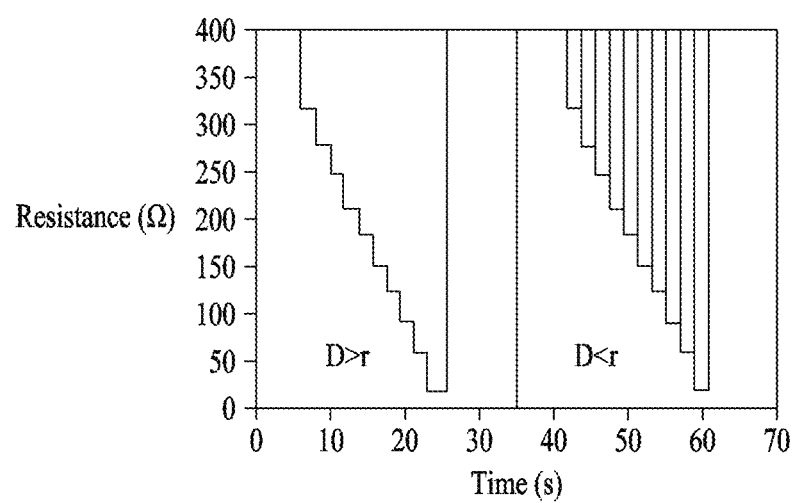
Figure 13E:
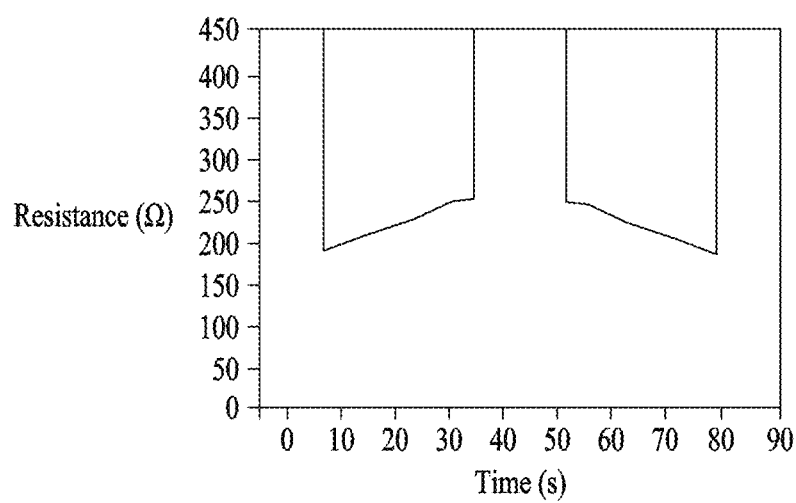

As shown in FIG. 13A, a 2D plane touch sensor array with two terminals was designed by using the pattern of multiple S shape. A bottom-left position was defined as a start point (0 cm from the electrode), the resistance was recorded every 2 cm, and results thereof were obtained (FIG. 13B). Finally, a fitting curve of a relationship between the resistance and the position was received. It was used to decode the position from the resistance response. For example, the positions of 11 cm, 28 cm, and 44 cm were touched in the 2D plane sensor array, respectively. From the corresponding responses, it is possible to decode that the responding stimuli has occurred at the positions of 10.3 cm, 28.3 cm, and 44 cm. In addition, based on the unique array structure, the 2D plane sensor array may recognize the dynamic movement in X and Y directions (FIG. 13C). It was found that a contact area affects a response signal shape. In an embodiment of the present disclosure, the hemispherical probe was used as a pressure source, a movement speed was 2 mm/s. When a diameter of a circular contact area D is larger than a width r of electrode, the response resistance shows a continuous step shape. Conversely, the resistance response had a shape of spikes (FIG. 13D). The signal transmission is real-time and a direction, movement positions, and information may be decoded from the resistance and time of the response spectrum. In the X direction, the contact resistance varies linearly with time (FIG. 13E).

While the embodiments are described, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents to the claims are also within the scope of the following claims.

What is claimed is:

1. A method of preparing a two-terminal stretchable touch array sensor, the method comprising:
    preparing an upper electrode comprising an upper electrode pattern and a lower electrode comprising a lower electrode pattern;
    preparing a spacer that is perforated in a same form as the upper electrode pattern and the lower electrode pattern; and
    performing assembling by interposing the spacer between the upper electrode and the lower electrode,
    wherein the preparing of the upper electrode comprising the upper electrode pattern and the lower electrode comprising the lower electrode pattern comprises:
    forming a sacrificial layer on a polymer film;
    forming a first electrode pattern by printing a first electrode pattern solution on the sacrificial layer;
    forming a second electrode pattern by printing a second electrode pattern solution on the first electrode pattern;
    spin-coating and curing a polymer solution on the polymer film on which the first electrode pattern and the second electrode pattern are formed;
    preparing each of the upper electrode and the lower electrode after removing the sacrificial layer and performing heat treatment; and
    forming a first terminal and a second terminal respectively on an end of the first electrode pattern of the upper electrode and an end of the first electrode pattern of the lower electrode, and
    wherein the first electrode pattern solution comprises metal flakes, a prepolymer, a silicone adhesive, and a solvent, and
    a weight ratio of the metal flakes: prepolymer: silicone adhesive: solvent is 9:2:1:3 to 3:2:1:3.

2. The method of claim 1, wherein the forming of the sacrificial layer on the polymer film comprises:

forming the sacrificial layer by spin-coating at least one solution selected from a group consisting of poly acrylic acid (PAA), poly (vinylpyrrolidone) (PVP), dextran, poly (methyl methacrylate) (PMMA), and poly (vinyl alcohol) (PVA) on an oxygen plasma-treated polymer film.

3. The method of claim 1, wherein
the metal flakes comprise at least one selected from a group consisting of gold (Au), silver (Ag), platinum (Pt), palladium (Pd), copper (Cu), cobalt (Co), zirconium (Zr), zinc (Zn), titanium (Ti), and tin (Sn), the prepolymer comprises at least one selected from a group consisting of polydimethylsiloxane (PDMS), a fluoroelastomer, poly (vinylidene fluoride-co-hexafluoropropylene) copolymer, thermosetting polyurethane, silicone, ecoflex, Dragon Skin, isoprene, styrene-ethylene-butylene-styrene (SEBS), styrene-butadiene-styrene (SBS), styrene-butadiene (SB), styrene-isoprene-styrene (SIS), ethylene-propylene (EPM, EPDM), and nitrile-butadiene (NB),
the silicone adhesive comprises at least one selected from a group consisting of sil-poxy, silicone adhesive E-43, KE series of Shin-Etsu Chemical, and DC3140, and
the solvent comprises at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha.

4. The method of claim 1, wherein
the second electrode pattern solution comprises a conductive LMMPs, a polymer, and a second solvent,
the conductive LMMPs comprises at least one selected from a group consisting of gallium (Ga), indium (In), tin (Sn), mercury (Hg), an eutectic gallium-indium alloy (EGaln), an eutectic gallium-indium-tin alloy (Galinstan), gallium/lead (Ga/Pb), gallium/cadmium (Ga/Cd), gallium/bismuth (Ga/Bi), and gallium/thallium (Ga/Tl),
the polymer comprises at least one selected from a group consisting of an (ethylene-vinyl acetate) copolymer (PEVA), styrene-butadiene-styrene (SBS), styrene-butadiene (SB), styrene-isoprene-styrene (SIS), a styrene-ethylene-butylene-styrene (SEBS) block copolymer, and aliphatic polyurethane,
the second solvent comprises at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha, and
a ratio of the conductive LMMPs: polymer: second solvent is 4:1:20 to 10:1:20.

5. The method of claim 1, wherein
in the forming of the first electrode pattern, screen printing is used, and
the first electrode pattern solution is printed and cured at a temperature of 50° C. to 100° C. for 30 minutes to 300 minutes.

6. The method of claim 1, wherein
in the forming of the second electrode pattern, nozzle printing is used, and
the nozzle printing is a method of performing printing by fixing a distance between a nozzle and a polymer film to 10 μm to 300 μm and keeping a temperature of a printer platform and the nozzle at 50° C. to 90° C.

7. The method of claim 1, wherein the spin-coating and curing of the polymer solution comprises performing curing at a temperature of 50° C. to 100° C. for 60 minutes to 300 minutes.

8. The method of claim 1, wherein
the preparing of each of the upper electrode and the lower electrode after removing the sacrificial layer and performing the heat treatment comprises removing and separating the sacrificial layer by immersing the polymer film, on which the polymer solution is cured, in deionized water for 30 to 300 minutes, and
the heat treatment is performed at a temperature of 100° C. to 200° C. for 1 hour to 12 hours.

9. A method of preparing a two-terminal stretchable touch array sensor, the method comprising:
preparing an upper electrode comprising an upper electrode pattern and a lower electrode comprising a lower electrode pattern;
preparing a spacer that is perforated in a same form as the upper electrode pattern and the lower electrode pattern; and
performing assembling by interposing the spacer between the upper electrode and the lower electrode, wherein the preparing of the upper electrode comprising the upper electrode pattern and the lower electrode comprising the lower electrode pattern comprises:
forming a sacrificial layer on a polymer film;
forming a first electrode pattern by printing a first electrode pattern solution on the sacrificial layer;
forming a second electrode pattern by printing a second electrode pattern solution on the first electrode pattern;
spin-coating and curing a polymer solution on the polymer film on which the first electrode pattern and the second electrode pattern are formed;
preparing each of the upper electrode and the lower electrode after removing the sacrificial layer and performing heat treatment; and
forming a first terminal and a second terminal respectively on an end of the first electrode pattern of the upper electrode and an end of the first electrode pattern of the lower electrode, and
wherein the second electrode pattern solution comprises a conductive LMMPs, a polymer, and a solvent, and
a ratio of the conductive LMMPs: polymer: solvent is 4:1:20 to 10:1:20.

10. The method of claim 9, wherein the forming of the sacrificial layer on the polymer film comprises:
forming the sacrificial layer by spin-coating at least one solution selected from a group consisting of poly acrylic acid (PAA), poly (vinylpyrrolidone) (PVP), dextran, poly (methyl methacrylate) (PMMA), and poly (vinyl alcohol) (PVA) on an oxygen plasma-treated polymer film.

11. The method of claim 9, wherein
the first electrode pattern solution comprises metal flakes, a prepolymer, a silicone adhesive, and a second solvent,
the metal flakes comprise at least one selected from a group consisting of gold (Au), silver (Ag), platinum (Pt), palladium (Pd), copper (Cu), cobalt (Co), zirconium (Zr), zinc (Zn), titanium (Ti), and tin (Sn),
the prepolymer comprises at least one selected from a group consisting of polydimethylsiloxane (PDMS), a fluoroelastomer, poly (vinylidene fluoride-co-hexafluoropropylene) copolymer, thermosetting polyurethane, silicone, ecoflex, Dragon Skin, isoprene, styrene-ethylene-butylene-styrene (SEBS), styrene-butadiene-styrene (SBS), styrene-butadiene (SB), styrene-isoprene-styrene (SIS), ethylene-propylene (EPM, EPDM), and nitrile-butadiene (NB), the silicone adhesive comprises at least one selected from a group consisting of sil-poxy, silicone adhesive E-43, KE series of Shin-Etsu Chemical, and DC3140, the second solvent comprises at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha, and a weight ratio of the metal flakes: prepolymer: silicone adhesive: second solvent is 9:2:1:3 to 3:2:1:3.

12. The method of claim 9, wherein the conductive LMMPs comprises at least one selected from a group consisting of gallium (Ga), indium (In), tin (Sn), mercury (Hg), an eutectic gallium-indium alloy (EGaIn), an eutectic gallium-indium-tin alloy (Galinstan), gallium/lead (Ga/Pb), gallium/cadmium (Ga/Cd), gallium/bismuth (Ga/Bi), and gallium/thallium (Ga/Tl), the polymer comprises at least one selected from a group consisting of an (ethylene-vinyl acetate) copolymer (PEVA), styrene-butadiene-styrene (SBS), styrene-butadiene (SB), styrene-isoprene-styrene (SIS), a styrene-ethylene-butylene-styrene (SEBS) block copolymer, and aliphatic polyurethane, and the solvent comprises at least one selected from a group consisting of acetone, cyclohexane, chloroform, 1,2-dichloroethane, toluene, trichloroethane, trichlorobenzene, benzene carbon tetrachloride, chlorobenzene, tetrahydrofuran (THF), xylene, tertiary butyl acetate, heptane, hexane, dimethyl ether, 2-butanone, methanol, butanone, and naphtha.

13. The method of claim 9, wherein in the forming of the first electrode pattern, screen printing is used, and the first electrode pattern solution is printed and cured at a temperature of 50° C. to 100° C. for 30 minutes to 300 minutes.

14. The method of claim 9, wherein in the forming of the second electrode pattern, nozzle printing is used, and the nozzle printing is a method of performing printing by fixing a distance between a nozzle and a polymer film to 10 μm to 300 μm and keeping a temperature of a printer platform and the nozzle at 50° C. to 90° C.

15. The method of claim 9, wherein the spin-coating and curing of the polymer solution comprises performing curing at a temperature of 50° C. to 100° C. for 60 minutes to 300 minutes.

16. The method of claim 9, wherein the preparing of each of the upper electrode and the lower electrode after removing the sacrificial layer and performing the heat treatment comprises removing and separating the sacrificial layer by immersing the polymer film, on which the polymer solution is cured, in deionized water for 30 to 300 minutes, and the heat treatment is performed at a temperature of 100° C. to 200° C. for 1 hour to 12 hours.

* * * * *